Patented Oct. 21, 1947

2,429,207

UNITED STATES PATENT OFFICE 2,429,207 p-AMINOBENZENE-SULFONAMIDES AND THEIR MANUFACTURE

Henry Martin and Rudolf Hirt, Basel, Switzerland, assignors to J. R. Geigy A. G., Basel, Switzerland No Drawing. Application September 1, 1942, Serial No. 456,942. In Switzerland June 21, 1940

3 Claims. (Cl. 260—397.7)

It has been found that valuable p-aminobenzene sulfonic acylamides of the general formula

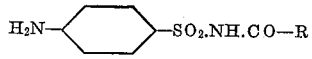

are obtained, in which R indicates an unsaturated, branched, aliphatic radical, when sulfonamides of the benzene series, which in the p-position to the sulfonamide group contain a nitrogen-containing group, are re-acted with unsaturated, branched, aliphatic carboxylic acids or their functional derivatives and the p-position nitrogen group is converted, if necessary, into an amino group. Compounds of this type have not become known up to the present time; they are distinguished from other p-aminobenzene sulfonamides by their superior activity relatively to infection promotors and by their slight poisonousness.

As sulfonamides of the benzene series which in the p-position to the sulfonamide group contain a nitrogen-containing group, may be mentioned: p-aminobenzene sulfonamide, p-acylaminobenzene sulfonamides, p-nitrobenzene sulfonamides and so forth. The nitro group may be replaced by any other group, capable of being converted by reduction into the amino group, for example the nitroso, azo, azoxy or hydrazo group.

Azomethine- and acyl-amino groups can be converted into amino groups by hydrolysis. It is advantageous to select from the acyl radicals those which are easily capable of being split off again. Such radicals are for example the acetyl or the carbomethoxy radicals, which are easily split off again by hydrolytic treatment without affecting the acylated sulfonamide group.

The sulfonamides of the benzene series, substituted in the p-position by a nitrogen-containing group, may be used as such, or in the form of their salts, for example sodium p-nitrobenzene sulfonamide or potassium p-acetylaminobenzene sulfonamide. The reaction with the acylating agents may also be effected as usual in the presence of bases such as pyridine, dimethyl aniline and so on.

As unsaturated, branched aliphatic carboxylic acids may be mentioned $\beta,\beta$-di-methyl acrylic acid $\alpha$- or $\beta$-ethyl crotonic acid, $\alpha,\beta,\beta$-trimethyl acrylic acid, $\alpha$-methyl-$\alpha$-allyl acetic acid, isobutylidene acetic acid, $\alpha$-methyl crotonic acid, $\alpha$-isopropyl crotonic acid and so on. The acids may be used as such for example in the presence of catalysts or in the form of their functional derivatives, whilst agents having an acid binding or condensing action may be used at the same time.

The invention is illustrated but not limited by the following examples. The parts are by weight, unless otherwise stated.

Example 1

21.4 parts of p-acetylamino-benzene sulfonamide and 18.2 parts of dimethylacrylic acid anhydride (produced from dry sodium dimethyl acrylate and dimethyl acrylic acid chloride; boiling point 18 140–145° C.) are heated together in a flask in the oil bath to 200–210° C. There is thus formed slowly a homogeneous fused mass. After heating for one hour it is dissolved in a hot diluted sodium carbonate solution, treated with some animal charcoal and filtered. The condensation product is precipitated from the filtrate by acidification with hydrochloric acid, drawn off and re-crytallised from alcohol. Melting point 231° C.

By saponifying the acetyl amino group with dilute soda lye on the water bath, p-aminobenzene sulfone-$\beta,\beta$-dimethyl acrylic acid amide with melting point 177–178° C. is obtained.

Example 2

21.4 parts of p-acetyl aminobenzene sulfonamide, 10 parts of dimethyl acrylic acid and 20 parts of phosphorus pentoxide are treated with 150 parts by volume of chlorobenzene and refluxed for 4 hours. Then some water is added thereto and the chlorobenzene is distilled off with steam. The residue is then poured into a sodium carbonate solution, treated with some charcoal, filtered and the filtrate is acidified with hydrochloric acid, whereupon the condensation product separates out. It is drawn off and re-crystallized from alcohol. Melting point 233° C.

By saponifying, the free amino compound is easily obtained.

Example 3

1 molecule of p-nitrobenzene sulfonamide is suspended in chlorobenzene, treated with 1.2 molecules of $\beta,\beta$-dimethyl acrylic acid and 1 molecule of phosphorus pentachloride and heated to boiling for some hours. After the addition of a little water the chlorobenzene is blown off with steam and the remaining p-nitrobenzene sulfone-$\beta,\beta$-dimethyl acrylic acid amide is poured into sodium carbonate solution, filtered from the small amount of unchanged nitrobenzene sulfonamide, again precipitated with acid and re-crystallized from alcohol. Melting point 155° C.

Example 4

50 parts of sodium (or potassium) p-nitrobenzene sulfonamide are suspended in 150 parts by volume of nitrobenzene and treated with 12 parts of β,β-dimethyl acrylic acid chloride. The temperature rises slowly to 50° C. and is maintained at this temperature for 4 hours. Then 300 parts of water are added, the whole is made alkaline to litmus, but neutral to phenol phthaleine and then stirred for 1 hour at 50° C. Thereupon the small quantity of unchanged sulfonamide is filtered off, the filtrate extracted with ethers and acidified; p-nitrobenzene sulfone-β,β-dimethyl acrylic acid amide then precipitates out in a 70% yield. Melting point 155° C.

Reduction according to Béchamp's method leads to the p-aminobenzene sulfone-β,β-dimethyl acrylic acid amide.

Instead of dimethyl acrylic acid there may also be used isobutylidene acetic acid, α-methyl-α-allyl acetic acid or α-methyl crotonic acid; the compounds thus obtained are also colorless and possess similar properties.

Example 5

535 parts of 4-acetylamino-benzene sulfonamide are mixed in 1000 parts of chlorobenzene with 300 parts of β,β-dimethyl acrylic acid chloride and 5 parts of copper powder and refluxed until hydrochloric acid ceases to be given off. After being allowed to cool, the reaction mixture is stirred into a 10% sodium carbonate solution heated to 50–60° C., then stirred for ½ hour, cooled down and filtered. The filtrate is distilled by steam and the condensation product is isolated therefrom by acidification.

The moist crude product drawn off is heated for 40 minutes to boiling with 1300 parts of 30% soda lye and 200 parts of water for saponification. Then it is cooled down and the free amino compound is precipitated with acetic acid and drawn off. For purification it can be poured into dilute sodium carbonate solution, then treated with animal charcoal, filtered after some time and again precipitated out with acetic acid. The p-aminobenzene-sulfone-β,β-dimethyl acrylic acid amide melts, when re-crystallized from dilute alcohol, at 177–178° C. Yield=340 parts.

Instead of copper powder other catalysts such as aluminum chloride, ferric chloride, tin tetrachloride, cupric chloride and so forth may be used.

Example 6

160 parts of p-acetyl-aminobenzene sulfonamide and 80 parts of anhydrous sodium carbonate are suspended in 500 parts of chlorobenzene, treated with 100 parts of β,β-dimethyl acrylic acid chloride and refluxed for 2 hours. The reaction mixture is stirred into 1500 parts of water, heated to 60° C., made weakly alkaline with sodium carbonate and the little which is undissolved is sucked off. The aqueous solution is separated from chlorobenzene in the separating funnel and then acidified. The separated resin which soon solidifies, is drawn off and washed with some water.

After saponifying the acetyl amino group with dilute soda lye the dimethyl acrylic acid derivative can be obtained in the usual way.

Instead of the β,β-dimethyl acrylic acid compounds used in the Examples 1 to 6 the corresponding α,β,β-trimethyl acrylic acid compounds, α-isopropyl crotonic acid or derivatives thereof may also be used, whereby there may be produced, for instance in the case of Example 1, the corresponding α,β,β-trimethyl acrylic acid amide of the melting point 161–162° C.

Example 7

25.7 parts of p-acetylaminobenzene sulfonamide are suspended in 150 parts by volume of chlorobenzene, treated with 15 parts of β-ethyl crotonic acid chloride and some copper powder and refluxed for 4 hours. Then it is cooled somewhat, shaken with dilute sodium carbonate solution and drawn off cold. The chlorobenzene is blown out of the filtrate by steam, the cooled residue treated with acid and the separated resin separated and washed with water. It is easily soluble in sodium carbonate-solution.

The acetyl group is split off with dilute soda lye by heating for half an hour on the water bath. From a hydrochloric acid solution there is obtained the chlorhydrate of p-aminobenzene sulfone-β-ethylcrotonic acid amide with melting point 189° C.

The isomeric α-ethyl-crotonic acid compound reacts exactly in the same manner as indicated in the above example.

Example 8

24.4 parts of 4-carboxy-aminobenzene sulfonamide are treated in a chlorobenzene solution with the calculated amount of β,β-dimethyl acrylic acid chloride and 5 parts of copper powder and the whole heated to boiling for 6 hours. Afterwards it is distilled by steam, the residue poured into sodium carbonate solution, filtered from the unchanged carbethoxy-aminobenzene sulfonamide and from the copper powder, treated with a little animal charcoal, filtered and acidified with hydrochloric acid. The precipitated 4-carbethoxyaminobenzene sulfone-β,β-dimethyl acrylic acid amide is re-crystallized from dilute acetone.

For splitting off the carbethoxy group the condensation product is dissolved in twice normal soda lye and heated for 15 minutes on the water bath. By acidifying with acetic acid the 4-aminobenzene sulfone-β,β-dimethyl acrylic acid amide is obtained.

Instead of the 4-carbethoxy-aminobenzene sulfonamide compound the corresponding carbomethoxy compound may also be used; furthermore the chloride of the β,β-dimethyl acrylic acid is also replaceable by the bromide or by a halide of another acid cited in the general part of the specification.

The metal salts of the compounds mentioned in the above examples may be made in the usual manner:

Example a 254 parts of p-aminobenzene sulfone-β,β-dimethyl-acrylic acid amide are hot dissolved in the required quantity of absolute alcohol. If necessary, it is hot filtered and the hot, clear solution is, while strongly stirred, at once treated with a filtered solution of 30 parts of sodium in 500 parts by volume of absolute alcohol. The sodium salt separates out immediately already in the hot condition in form of a white powder. The whole is, while stirring, cooled down, whereupon the precipitate is drawn off. The sodium salt is washed with absolute alcohol, until a test dissolves in water neutral to phenolphthaleine. The salt dried in vacuo at 60° C. is obtained in form of a pure white powder. Yield 265 parts.

The potassium salt is obtained in exactly the same manner.

Example b 27.6 parts of the sodium salt prepared according to the foregoing example are dissolved in 200 parts by volume of distilled water and 10.1 parts of $MgCl_2.6H_2O$ in a little water are added thereto. Now the solution is completely evaporated to dryness in vacuo. The residue is taken up in 300 parts by volume of hot absolute alcohol, the mixture is cooled down and allowed to stand cold for 4 hours. Then undissolved matters are filtered off and the filtrate is evaporated to dryness in vacuo. The magnesium salt is thus obtained in form of an amorphous mass; it is easily soluble in water.

Example c 50 parts of p-aminobenzene sulfone-β,β-dimethyl acrylic acid amide are dissolved in the calculated quantity of caustic soda lye of 1 per cent strength and treated with a clear solution of 14 parts of zinc chloride in 100 parts by volume of water. The solution is allowed to stand for 1 hour, the zinc salt separated out is drawn off and washed several times with distilled water. Finally it is dried in vacuo at 60° C. and obtained in form of a white, light powder which is difficultly soluble in water.

The calcium salt is obtained in the same form according to the usual process.

What we claim is:

1. A therapeutically active p-aminobenzene-sulfonamide of the formula

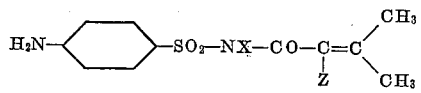

wherein Z is a member selected from the group consisting of H and $CH_3$, and X is a member of the group consisting of H, K, Na, Mg, Zn and Ca.

2. The p-aminobenzene-sulfonamide of the formula

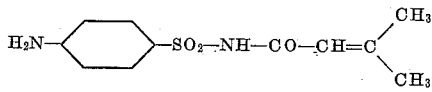

which is a colorless compound of melting point 177–178° C.

3. The p-aminobenzene-sulfonamide of the formula

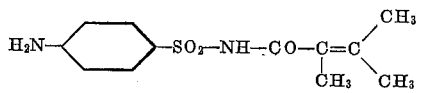

which is a colorless compound of melting point 161–162° C.

HENRY MARTIN.
RUDOLF HIRT.

REFERENCES CITED

The following references are of record in the file of this patent:

FOREIGN PATENTS

| Number | Country | Date |
|---|---|---|
| 111,230 | Australia | Aug. 22, 1940 |

OTHER REFERENCES

Crossley et al., Jour. Am. Chem. Soc., vol. 61, pp. 2950–2955, Oct. 1939.

Schweizerische Medzinische Wochenschrift No. 31, Aug. 2, 1941, pp. 901, 905 and 906.